(12) United States Patent
Kim et al.

(10) Patent No.: US 6,908,054 B1
(45) Date of Patent: Jun. 21, 2005

(54) INTERNALLY ADJUSTABLE BRAKE FOR BAITCAST REEL

(75) Inventors: Hyunkyu Kim, Broken Arrow, OK (US); Christopher S. Littau, Bartlesville, OK (US)

(73) Assignee: W.C. Bradley/Zebco Holdings, Inc., Tulsa, OK (US)

( * ) Notice: Subject to any disclaimer, the term of this patent is extended or adjusted under 35 U.S.C. 154(b) by 61 days.

(21) Appl. No.: 10/644,275

(22) Filed: Aug. 20, 2003

(51) Int. Cl.$^7$ .......................................... A01K 89/015
(52) U.S. Cl. ................................. 242/289; 188/181 A
(58) Field of Search ............................. 242/289, 292, 242/294; 188/181 A, 185

(56) References Cited

U.S. PATENT DOCUMENTS

| | | | |
|---|---|---|---|
| 5,108,042 A | 4/1992 | Puryear et al. | |
| 5,308,021 A | 5/1994 | Ikuta | 242/289 |
| 5,803,385 A * | 9/1998 | Baisch | 242/289 |
| 5,865,387 A * | 2/1999 | Hirano | 242/289 |
| 5,985,221 A * | 11/1999 | Knecht | 423/22 |
| 6,003,798 A * | 12/1999 | Kim | 242/289 |
| 6,168,106 B1 * | 1/2001 | Cockerham | 242/289 |
| 6,336,605 B1 * | 1/2002 | Littau et al. | 242/289 |
| 6,394,381 B1 * | 5/2002 | Hirayama | 242/289 |
| 6,398,141 B1 | 6/2002 | Kim | 242/289 |
| 6,416,001 B1 * | 7/2002 | Chang | 242/289 |
| 6,422,498 B1 | 7/2002 | Littau et al. | 242/288 |

* cited by examiner

Primary Examiner—Emmanuel Marcelo
(74) Attorney, Agent, or Firm—Fellers, Snider, Blankenship, Bailey & Tippens, P.C.

(57) ABSTRACT

A braking apparatus for a fishing reel. The braking apparatus includes a braking assembly. A contacting structure surrounds the braking assembly. A plurality of braking elements are slidably located within the braking assembly. The braking elements slidably move from a retracted position to an extended position. In the extended position, the braking elements make braking contact with the contacting structure. Each braking element has a protuberance that extends into an indentation on a selector. The selector is adapted to restrict selected braking elements from contacting the contacting structure. By rotating the selector, protuberances on selected braking elements are radially aligned with an outer wall segment of an indentation that is a desired distance from the selector axis and brake assembly axis. Therefore, selected braking elements are restricted from full radial movement, thereby controlling braking by selectively permitting greater or fewer braking elements from contacting the contacting structure.

18 Claims, 6 Drawing Sheets

INTERNALLY ADJUSTABLE BRAKE FOR BAITCAST REEL

FIELD OF THE INVENTION

The present invention relates to braking systems for fishing reels. More particularly, but not by way of limitation, the present invention relates to adjustable, centrifugal braking systems for baitcast fishing reels.

BACKGROUND OF THE INVENTION

Baitcast fishing reels are well known in the art. A baitcasting reel typically includes a split frame having a pair of opposing side plates, a foot extending from the frame for attaching the reel to a fishing rod, and a line spool rotatably positioned between the frame side plates for retrieving and holding a fishing line. A spool shaft, on which the spool is secured, has ends extending through the frame side plates. A pinion gear (typically a helical gear) is provided on the spool shaft. A manually rotatable crank handle drives a gear train and crankshaft assembly mechanically linking the crank handle to the spool shaft pinion gear. A level-wind mechanism transverses the spool during winding to ensure that the fishing line is properly wound along the length of the spool. An anti-reverse mechanism is provided for preventing reverse rotation of the crank handle and spool. A clutch mechanism disengages the pinion gear from the spool shaft to allow the spool to rotate freely during casting and an exterior actuator (typically a thumb lever) engages the clutch. A spool drag or spool braking mechanism is also provided.

In most cases, right and left side covers are removably attached to the frame side plates for housing various operating mechanisms of the reel. A right-handed baitcasting reel (i.e., a reel designed for a right-handed user) will typically be structured such that the spool drag or spool braking mechanism is housed under the left side cover. The crank handle is rotatably mounted outside of the right side cover and the crankshaft, gear train, pinion gear, clutch, and anti-reverse mechanism are housed under the right side cover. As will be understood by those skilled in the art, a left-handed version of generally any baitcasting reel can be produced by simply reversing the arrangement and structure of the reel's components such that the left-handed reel is a mirror image of the right-handed version of the reel.

Two basic styles of reels dominate the baitcasting market. One type consists of traditional baitcasting reels having high, round profiles. The other type consists of low profile, contemporary reels having teardrop or generally oval shapes. As used herein, the term "high profile" refers to a reel profile wherein the spacing of the top of the reel above the top of the rod is relatively high, when the reel is secured to a fishing rod. The term "low profile," as used herein, refers to a reel profile wherein the spacing of the top of the reel above the top of the rod is relatively low.

The low profile nature of the contemporary baitcasting reel desirably allows the user to "palm" the reel during winding. When palming the fishing reel, the user positions one hand around both the reel and the rod and turns the crank handle with the other hand. Many users find that holding the rod and reel in this manner provides comfort and balance. While palming the reel, the user will also typically hold the fishing line such that, during winding, the line passes between the thumb and the forefinger of the palming hand. Thus, palming also serves to remove moisture from the line and, by maintaining a desirable amount of tension on the line, promotes efficient winding.

Spool drag or spool braking systems are commonly used in baitcasting reels to alleviate line backlashing (also referred to as "line nesting") problems. Because baitcasting reels utilize transversely-oriented spools, which rotate during casting, baitcasting reels are more prone to backlashing problems than are spinning reels and spin-casting reels. Backlashing problems result primarily from the rotational momentum carried by the spool. The most common types of drag/braking mechanisms used in baitcasting reels are magnetic drag systems and centrifugal braking systems.

U.S. Pat. No. 5,108,042 discloses an adjustable, magnetic drag mechanism housed within the left side cover of a right-handed baitcast reel. The mechanism operates by exerting a magnetic drag force on the left end of the reel spool. The magnetic force slows the rotation of the spool during casting. The mechanism comprises a magnet carrier ring having a plurality of permanent magnets attached thereto, an axially movable cam disc to which the magnet carrier ring is secured, and an adjustment dial projecting through a recess in the left cover. The dial is operatively associated with the cam disc for selectively moving the carrier ring toward and away from the left end of the spool to adjust the amount of magnetic drag force applied to the spool.

Unfortunately, the amount of drag force imparted by this type of magnetic system does not vary in proportion to the rotational speed of the spool. Rather, for any selected magnet position, the system imparts a constant magnetic dragging force. Thus, for example, when the user has been casting a short distance and then decides to cast a long distance, the user must either adjust the magnetic drag system prior to making the long cast or compensate the magnetic force by applying thumb pressure to the reel spool.

U.S. Pat. No. 5,308,021 discloses a centrifugal braking system commonly used in baitcasting reels. The centrifugal braking system includes a plurality of rod-like members projecting radially from the end of the spool shaft, a plurality of tubular braking pieces or weights slidably mounted on the rod-like members, and a fixed brake ring encompassing the distal ends of the rod-like members. When the spool shaft rotates, the braking pieces move outwardly on the rod-like members into frictional contact with the brake ring. This frictional contact provides a braking force that slows the rotation of the spool.

The centrifugal braking system desirably exerts a braking force that varies in proportion to the rotational speed of the spool. Unfortunately, however, to make even minor adjustments to the centrifugal system (e.g., to account for the use of a heavier or lighter lure), the left side of the reel must be disassembled and the individual braking pieces must be individually manipulated. Typically, the individual pieces can be snapped into fixed position adjacent the spool shaft whereby the pieces are prevented from sliding into frictional contact with the brake disc. Alternatively, the individual braking pieces can be either replaced or removed.

In addition to adjustment problems, centrifugal braking assemblies of the type used in U.S. Pat. No. 5,308,021 require a relatively large amount of space, are easily damaged (e.g., by bending the rods while making system adjustments), and can easily become unbalanced.

U.S. Pat. No. 5,308,021 discloses a centrifugal braking system wherein the braking force exerted by the system can be selectively adjusted by operating a dial mechanism positioned under the left cover of the reel. Like the standard centrifugal braking system discussed above, the U.S. Pat.

No. 5,308,021 system utilizes a plurality of individual tubular braking pieces slidably mounted on radial, rod-like members projecting from the end of the spool shaft. However, rather than using a fixed braking ring, the U.S. Pat. No. 5,308,021 system employs an axially movable braking structure. Additionally, rather than having a strictly cylindrical braking surface, the U.S. Pat. No. 5,308,021 braking structure presents a frusto-conical braking surface that diverges toward a small diameter, cylindrical braking surface. Further, the roughness of the braking surface varies such that the frictional coefficient presented by the surface increases as the surface is adjusted axially toward the braking elements. Thus, the degree of frictional braking force provided by the U.S. Pat. No. 5,308,021 system can be adjusted by changing the point of contact between the braking structure and the braking pieces.

Unfortunately, the U.S. Pat. No. 5,308,021 system uses only a tubular-type braking element assembly and is therefore subject to the same space, damage, and balance problems discussed above. Further, unless the U.S. Pat. No. 5,308,021 reel is disassembled and the individual braking elements are either removed or locked into position adjacent to the spool shaft, the U.S. Pat. No. 5,308,021 system cannot be adjusted such that the individual braking pieces are completely prevented from contacting any portion of the braking surface. Moreover, the production of a braking surface of the type employed in U.S. Pat. No. 5,308,021 having a varying degree of roughness would be both difficult and costly.

The braking system of U.S. Pat. No. 5,308,021 is also likely to produce significant noise problems. Tubular braking elements of the type used in the U.S. Pat. No. 5,308,021 system will spin and wear when contacting either an inclined braking surface or a braking surface having a progressively increasing coefficient of friction. Such spinning and wear will likely cause the tubular braking elements to rattle. A substantial amount of rattle will likely also occur when the braking elements frictionally contact the rougher portions of the braking surface.

SUMMARY OF THE INVENTION

The present invention provides an adjustable braking apparatus and braking element assembly. The braking apparatus and braking element assembly satisfy the needs and alleviate the problems mentioned above. The braking system of the invention provides a proportional braking force that varies in relation to the rotational speed of the reel spool. The braking system of the invention requires less space than previous systems and provides easy adjustment without having to manipulate individual brake elements. Additionally, in the system of the invention, individual braking pieces can be taken completely out of braking position by means of simple adjustment. Further, compared to prior tubular-type braking element assemblies, the inventive braking element assembly is sturdier, more stable, and less susceptible to damage.

In one aspect, the inventive braking apparatus comprises a contacting structure and a plurality of braking elements for contacting the contacting structure to generate a braking force. A brake element assembly has a brake setting selector that allows a user to control which, if any, braking elements will be permitted to engage the contacting structure, thereby allowing a user to control the braking force. The inventive braking apparatus is further provided with indicia for identifying the brake setting positions.

Further objects, features, and advantages of the present invention will be apparent to those skilled in the art upon examining the accompanying drawings and upon reading the following description of the preferred embodiments.

DESCRIPTION OF THE PREFERRED EMBODIMENTS

Figure 1:
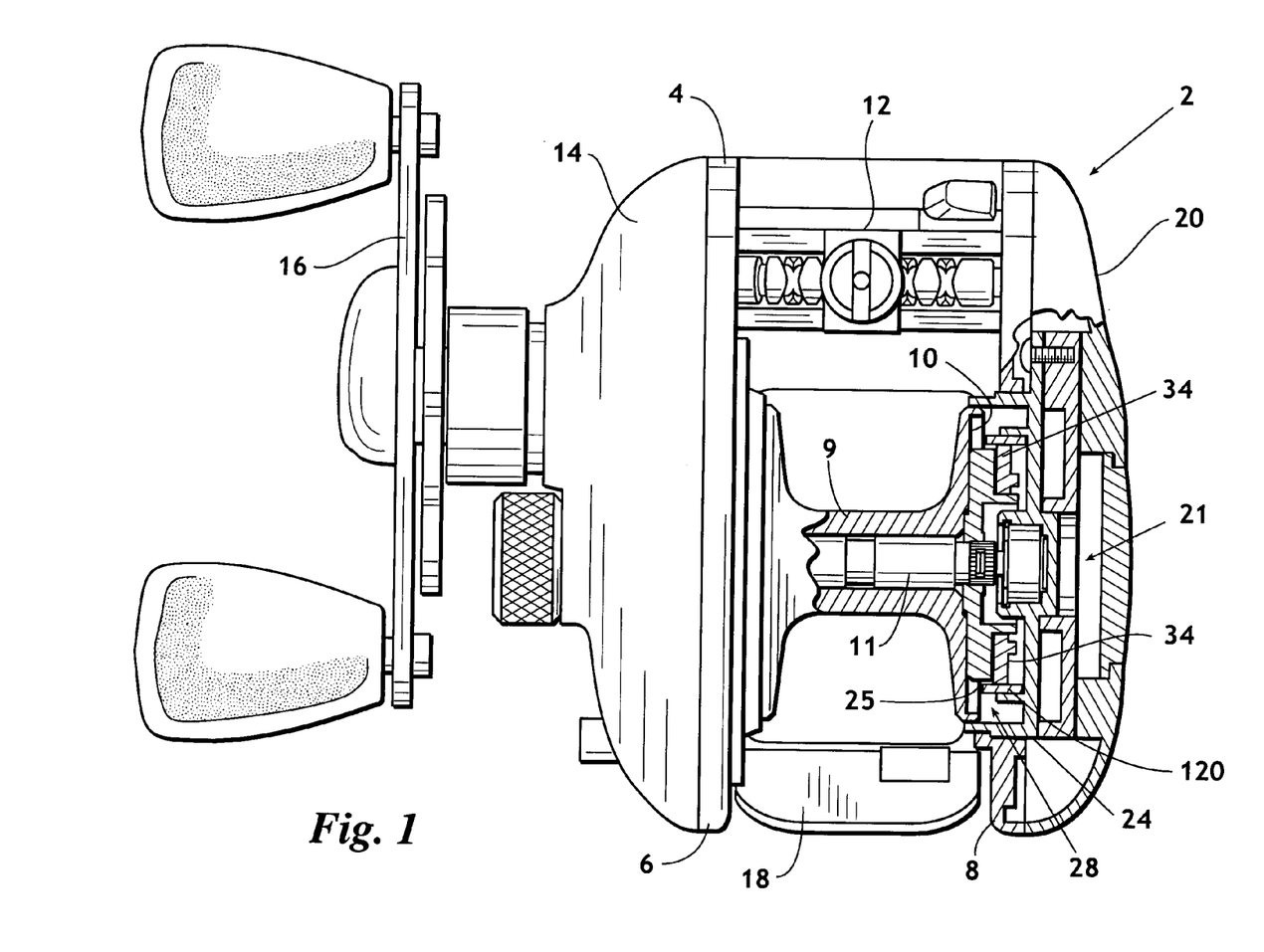
FIG. 1 is a partially cutaway, elevational view of a baitcasting reel having the inventive braking apparatus.

Depicted in FIG. 1 is a left-handed baitcasting reel 2. Baitcasting reel 2 is a low-profile, contemporary, tear-drop shaped reel including a split frame 4 having a left side plate 6 and a right side plate 8. A line spool 9 is rotatably mounted in frame 4 between side plates 6 and 8. Line spool 9 has a spool end 10 defined thereon. A spool shaft 11 extends through spool 9. A level-wind mechanism 12 traverses spool 9 during winding to ensure that the line is properly wound along the entire length of spool 9. A left side cover 14 is secured over left side plate 6. A crank handle 16 operably extends from left side cover 14 for rotating spool 9. A reel foot 18 is provided on the bottom of frame 4 for attaching reel 2 to a fishing rod. A right side cover 20 is secured over right side plate 8. Braking apparatus 21 is housed within right side cover 20.

For purposes of example the apparatus of the invention is herein described as incorporated in a left-handed baitcasting reel. However, it should be understand that the apparatus of the invention is equally adaptable for use in right-handed baitcasting reels.

Figures 2, 9:
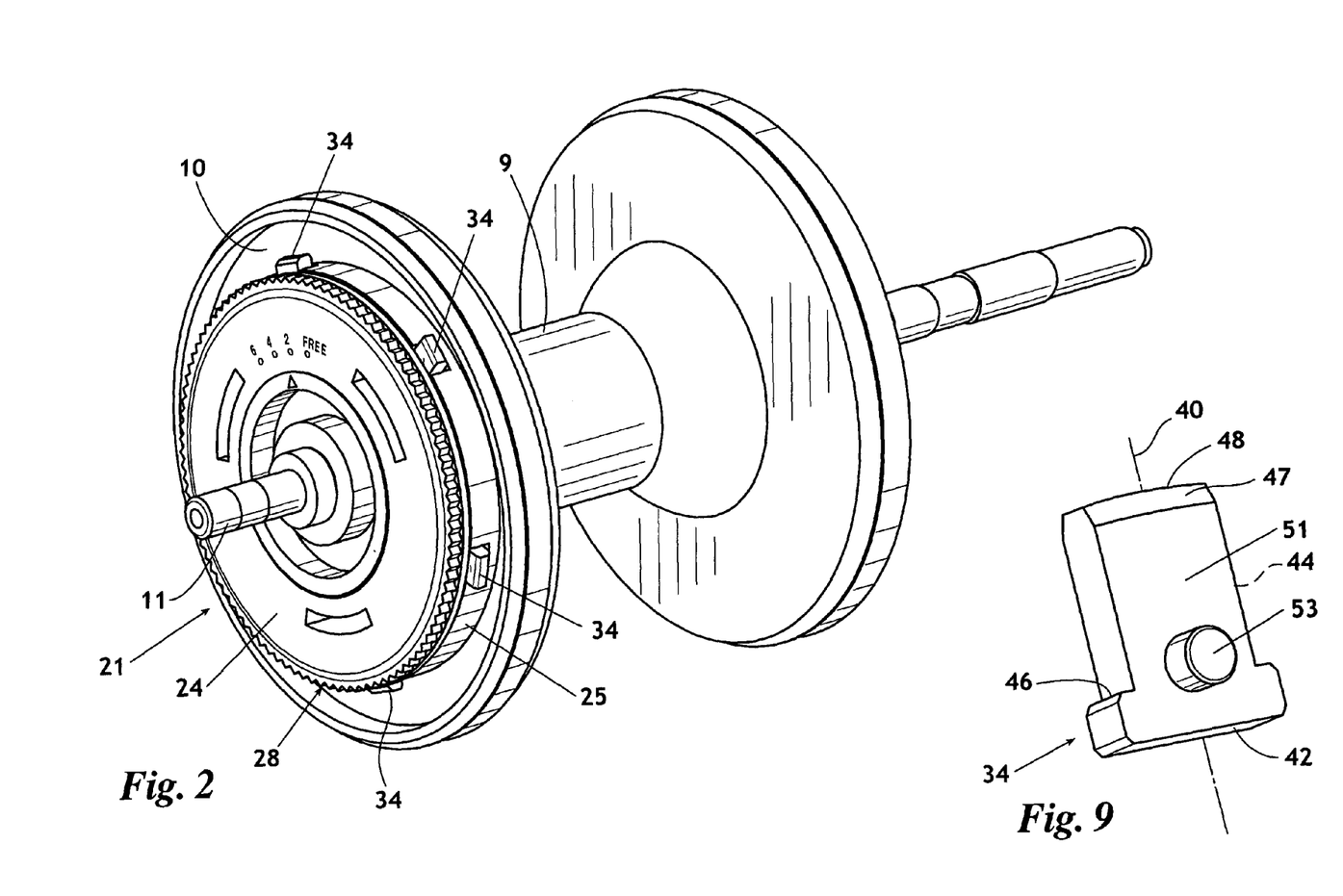
FIG. 2 is a perspective view of the spool assembly of the reel of FIG. 1.
FIG. 9 is a perspective view of a brake element of the brake assembly of FIG. 1.

Braking apparatus 21 preferably includes brake setting selector 24 (FIG. 2) and a brake assembly base 25 (FIG. 2) that form a braking assembly 28 (FIG. 2). Braking assembly 28 retains a plurality of brake elements 34.

As depicted most clearly in FIG. 9, each brake element 34 is preferably a T-shaped structure having a longitudinal axis 40, a wide retaining end 42 and an elongate portion 44 extending from retaining end 42. A pair of retaining shoulders 46 are defined by the transition from retaining end 42 to elongate portion 44. Elongate portion 44 has a tapered distal end 47 providing an outwardly projecting brake pad 48. Each braking element 34 preferably has both a flat forward surface 51 and an opposing flat rearward surface. Flat forward surface 51 is provided with a protruding post 53.

As used herein, the terms "forward" and "forwardly facing" describe features facing outwardly away from spool end 10 of line spool 9. The terms "rearward" and "rearwardly facing," on the other hand, describe features facing toward spool end 10 of line spool 9.

Referring now more particularly to FIGS. 3–6, brake assembly base 25 is preferably a substantially cylindrical member having a longitudinal axis of rotation 54 (FIG. 5) a forward face 56 (FIGS. 5, 6) a rearward face 58 (FIG. 4), and a cylindrical outer wall 60. Snap receptacles 62 extend between forward face 56 and rearward face 58. Passage 64 is provided to receive spool shaft 11. A plurality of radial slots 68a, 68b, 68c, 68d, 68e, and 68f are provided for slidably receiving brake elements 34. Brake assembly base 25 further includes a projecting cylinder 65 having an indicator 66 thereon.

Figure 5:
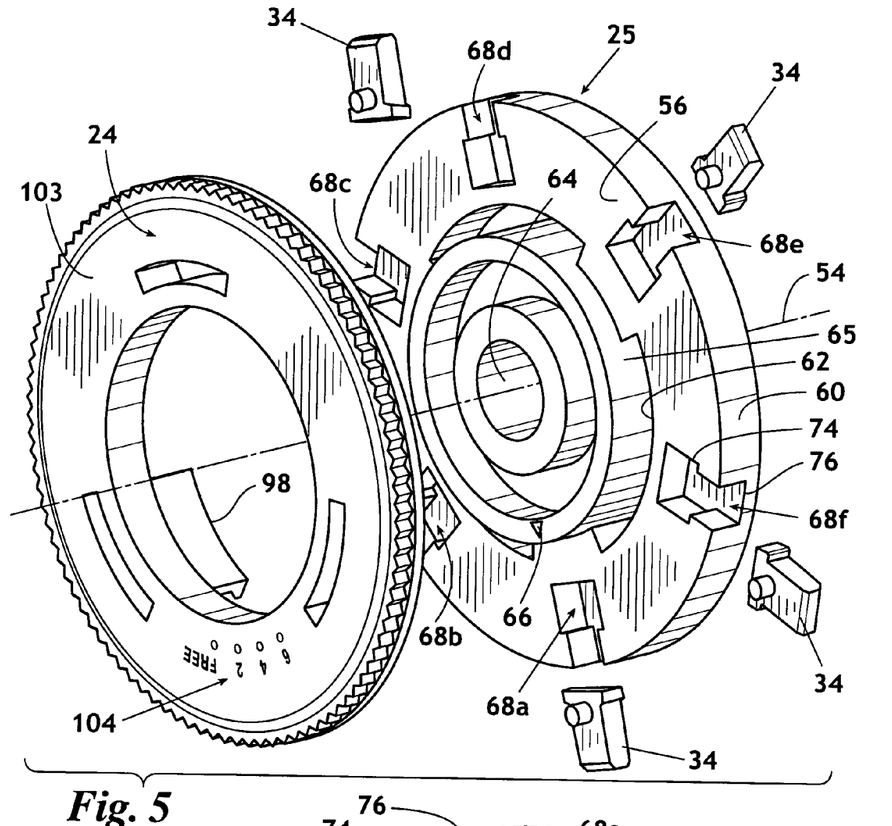
FIG. 5 is an exploded perspective view of the brake assembly of FIG. 1 including brake elements.
Figure 6:
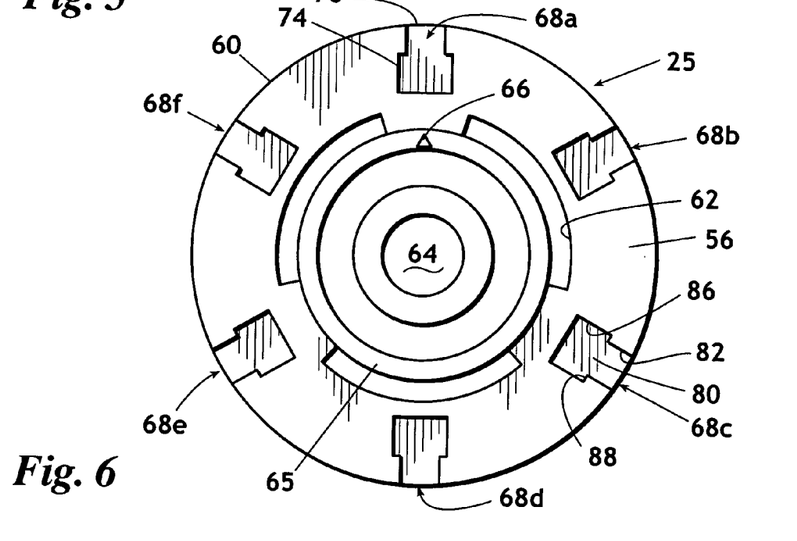
FIG. 6 is a plan view of the brake assembly base, which comprises the brake assembly of FIG. 1.

Referring now primarily to FIGS. 5 and 6, radial slots 68a–f each preferably have forward openings 74 in communication with forward face 56 of brake assembly base 25. Outer openings 76 are provided in outer wall 60. Forward openings 74 are substantially T-shaped. Brake elements 34 are slidably received in the T-shaped forward openings 74 for sliding radial movement. Radial slot 68a–f preferably includes a bottom surface 80, a narrow radial passage 82 extending into brake assembly base 25 from outer opening 76, and a wide inner segment 86 communicating with narrow passage 82. A pair of longitudinally extending interior shoulders 88 are defined by the transition from narrow passage 82 to inner segment 86. Narrow passages 82 are sized for slidably receiving the elongate portions 44 of brake elements 34. Inner segments 86 are sized for slidably receiving the wide retaining ends 42 of brake elements 34.

Each of slots 68a–f has a depth defined by the distance from forward face 56 of brake assembly base 25 to the bottom surface 80 of the slot. Slots 68 a–f are preferably evenly spaced around brake assembly base 25 and are preferably configured such that slot 68a is diametrically opposed to, and of equal depth with slot 68d, slot 68b is diametrically opposed to, and of equal depth with slot 68e, slot 68c is diametrically opposed to, and of equal depth with slot 68f. Positioning slots 68a–f in the manner just described ensures balanced rotational operation of brake element assembly 28.

Figure 7:
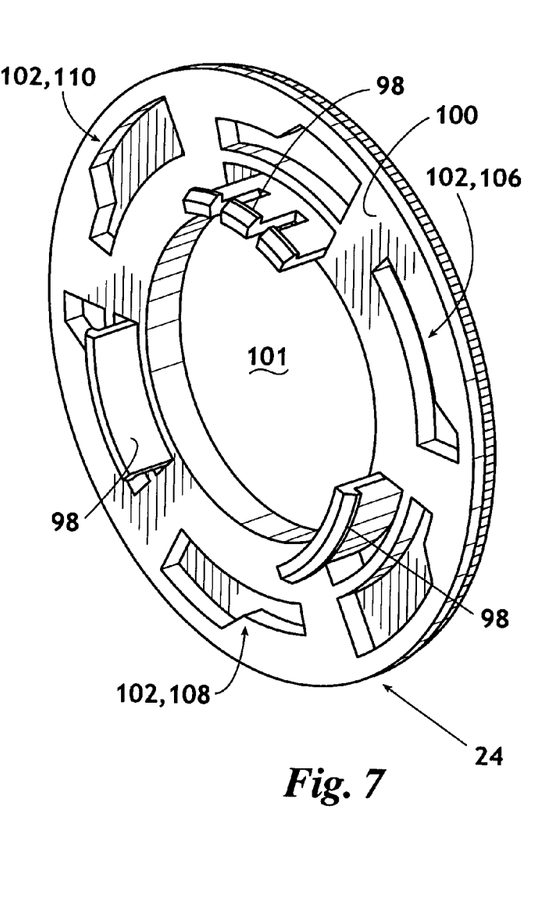
FIG. 7 is a rear perspective view of a brake setting selector, which comprises the brake assembly of FIG. 1.
Figure 8:
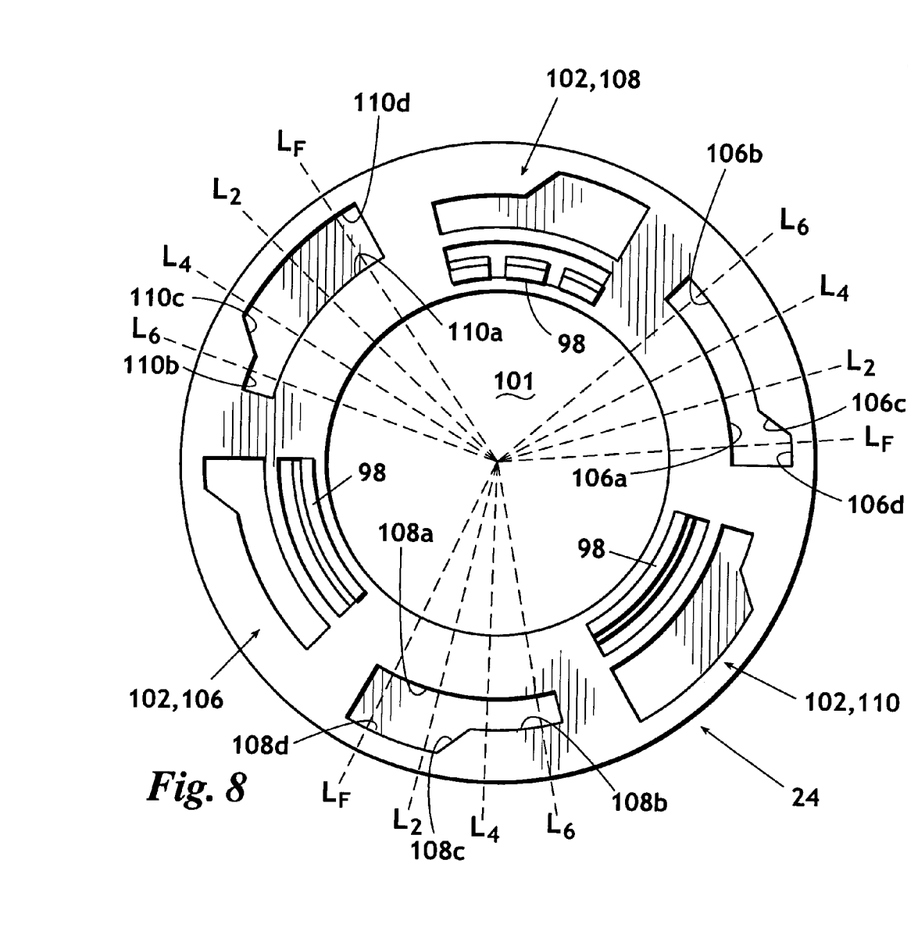
FIG. 8 is a rear plan view of the brake setting selector, which comprises the brake assembly of FIG. 1.

Referring now primarily to FIGS. 7 and 8, brake setting selector 24 preferably includes three resilient snap prongs 98 that extend from a rearward face 100 that surrounds central opening 101 of selector 24. A plurality of radial camming indentations 102 are formed in rearward face 100 of brake setting selector 24. Preferably, camming indentations 102 are formed in opposite pairs, wherein each pair has a distinct camming characteristic. For example, in the preferred embodiment, as shown in FIGS. 7 and 8, six camming indentations 102 are divided into three opposing pairs of camming indentations 102, which may be referred to as most restrictive indentation 106, intermediate restrictive indentation 108 and least restrictive indentation 110. Forward face 103 (FIG. 5) is preferably provided with indicia 104 located around a perimeter of central opening 101. Examples of indicia include four settings labeled "Free", "2", "4", and "6".

Referring now primarily to FIG. 8, most restrictive camming indentations 106 have a curved inner wall 106a having a constant radius and an outer wall, which varies in distance from longitudinal axis 54. The outer walls function as a camming surface and have a small radius segment 106b, a transitional segment 106c, and a large radius segment 106d.

Intermediate restrictive indentations 108 have a curved inner wall 108a having a constant radius. Intermediate restrictive indentations 108 have an outer wall, which varies in distance from longitudinal axis 54. The outer walls function as a camming surface and have a small radius segment 108b, a transitional segment 108c, and a large radius segment 108d.

Least restrictive indentations 110 have a curved inner wall 110a having a constant radius. Least restrictive indentations 110 have an outer wall, which varies in distance from longitudinal axis 54. The outer wall functions as a camming surface and has a small radius segment 110b, a transitional segment 110c, and a large radius segment 110d.

Preferably, inner walls 106a, 108a, 110a, share the same radius of curvature. Additionally, it is preferred that small radius segments 106b, 108b, 10b, and large radius segments 106d, 108d, 112d of the outer walls of indentations 106, 108, 110 also share the same radius of curvature.

Figure 10:
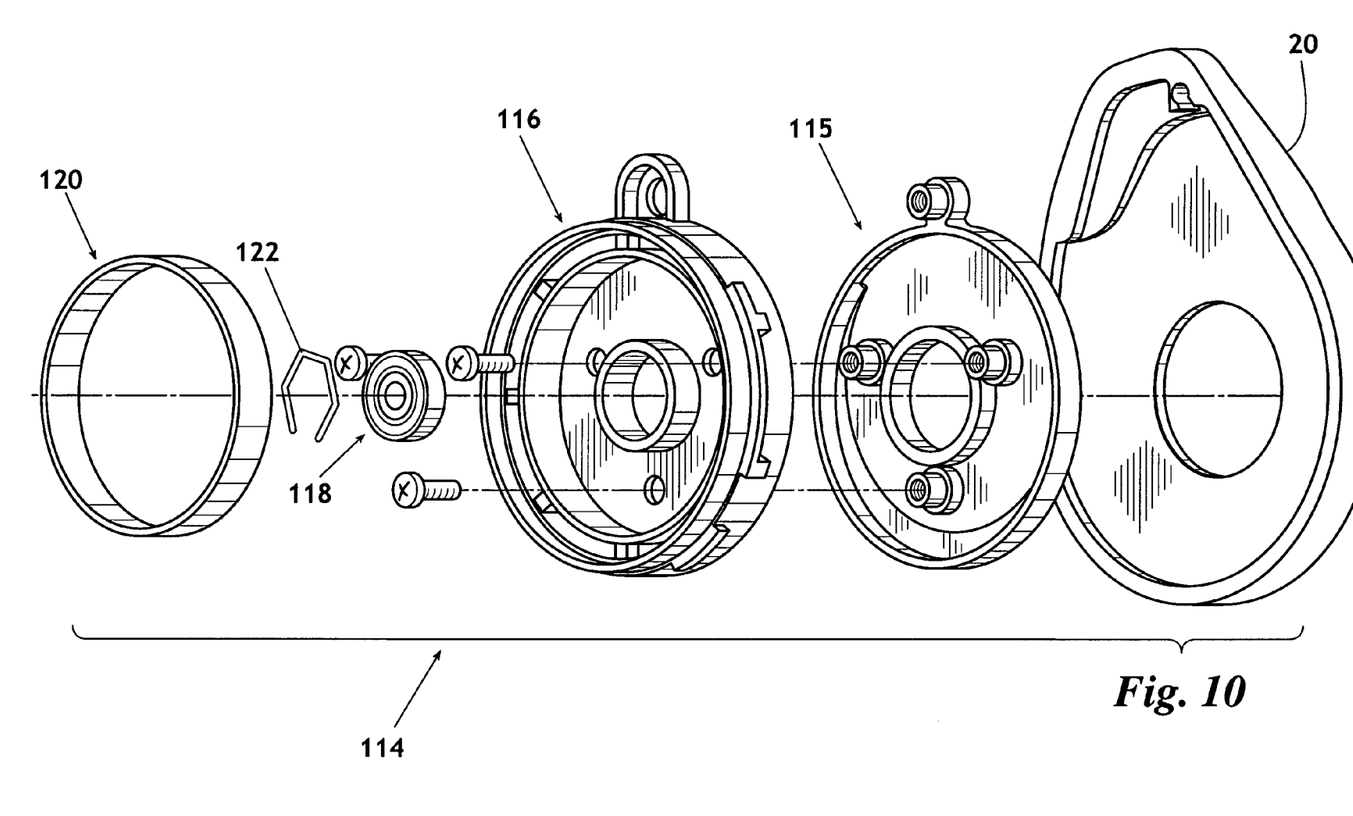
FIG. 10 is a first exploded perspective view of the right side cover assembly including the contacting structure of the reel of FIG. 1.

Referring now to primarily FIG. 10, a contacting structure or brake ring assembly 114 is affixed to an inside surface of right side cover 20. Brake ring assembly 114 preferably includes a base member 115, a brake ring housing 116, a spool shaft bearing 118 and a brake ring 120. A contacting structure, such as brake ring 120 is received within brake ring housing 116. Brake ring 120 is preferably constructed of metal and closely surrounds braking assembly 28 when right side cover 20 is secured to frame 4 of reel 2, as shown in FIG. 1. Brake ring 120 is positioned to receive selective engagement with brake elements 34. Spool shaft bearing 118 is secured within brake ring housing 116 with retainer spring 122. Spool shaft bearing 118 receives an end of spool shaft 11.

In use, brake assembly 28 operably retains brake elements 34 in the radial slots 68a–f of brake assembly base 25. Brake assembly base 25 is attached to spool end 10 of spool 9 as shown in FIG. 2. Brake assembly base 25, therefore, rotates with spool 9. When secured to spool 9, the rotational axis 54 of braking assembly 28 is collinear with the rotational axis of spool 9. Brake setting selector 24 is rotatably attached to brake assembly base 25 by snapping resilient snap prongs 98 (FIG. 7) into snap receptacles 62 (FIGS. 5, 6) of brake assembly base 25.

Brake elements 34 are retained within radial slots 68a–f of brake assembly base 25 by rearward face 100 of brake setting selector 24. Posts 53, which protrude from flat forward surface 51 of brake elements 34, are received within camming indentations 102 (FIGS. 7 and 8), formed on rearward face 100 of brake setting selector 24.

When braking assembly 28 rotates with spool 9, the resulting centrifugal force imparted to brake elements 34 urges brake elements 34 to slide radially outward in slots 68 away from axis 54. Braking elements 34 are sized such that, at least when elements 34 slide into their outermost radial positions, brake elements 34 project from braking assembly 28 through the outer openings 76 formed in outer wall 60 of brake assembly base 25. In a preferred embodiment of the inventive braking apparatus, brake elements 34 project from openings 76 to operably interact with brake ring assembly 120 (FIGS. 1, 10).

The outward, radial braking movement of brake elements 34 away from longitudinal axis 54 is limited either by the abutment of brake element retaining shoulders 46 with shoulders 88 of radial slots 68 or by contact of brake pad 48 of brake element 34 with brake ring 120. When radially extended, brake elements 34 engage brake ring 120 to provide braking action.

Selected brake elements 34 may be restrained from radial braking movement by positioning brake setting selector 24 in a desired position. When brake setting selector 24 and brake assembly base 36 are assembled to form brake element assembly 28, camming indentations 102 (FIGS. 7, 8) on the brake setting selector 24 are positioned relative to radial slots 68a–f such that posts 53 of brake elements 34 extend past the rearward face 100 of brake setting selector 24 and into the camming indentations 102.

By selectively orienting the brake setting selector 24 in a desired rotational orientation with respect to the brake assembly base 25, the brake elements 34 are selectively allowed full radial travel or are restricted from full radial travel, i.e., selected brake elements 34 are either permitted to move radially outward within slots 68 to make contact with brake ring 120 or not. By allowing all of the brake elements 34 to move outwardly and contact brake ring 120, maximum braking is achieved. By allowing a selected fewer number of brake elements 34 to contact brake ring 120, a controlled lesser amount of braking may be achieved.

Figure 3:
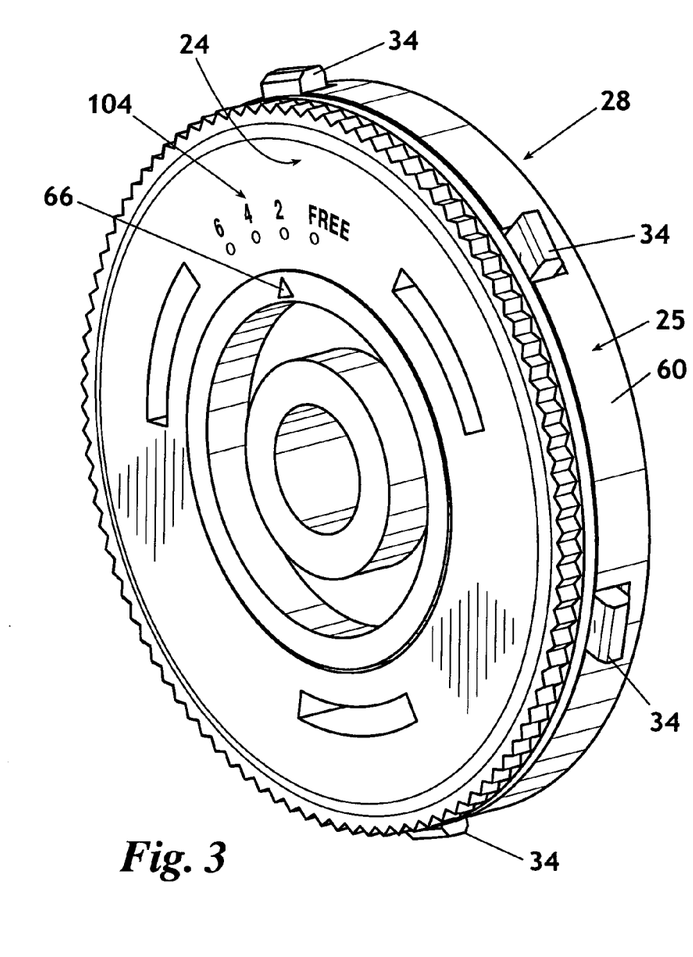
FIG. 3 is a perspective view of the braking assembly of FIG. 1.
Figure 4:
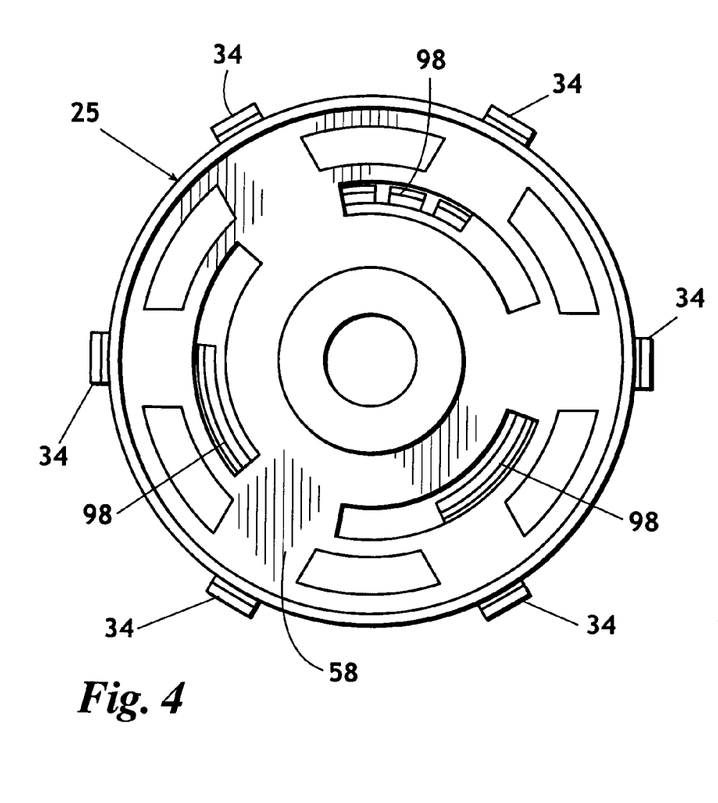
FIG. 4 is a rear view of the braking assembly of FIG. 1.

Turning now to FIGS. 3 and 8, a selected amount of braking may be achieved as follows. As set forth above, when brake assembly base 25 and brake setting selector 24 are assembled to form braking assembly 28, posts 53 (FIG. 9) of brake elements 34 protrude into camming indentations 102, e.g., most restrictive camming indentation 106, intermediate restrictive camming indentation 108, and least restrictive camming indentation 110. When brake setting selector 24 is positioned in the "free" position, each of posts 53 are located on radial lines $L_f$ (FIG. 8) that intersect large radius segments 106d, 108d, 10d. Posts 53 may travel from a first position in contact with inner walls 106a, 108a, 110a to a position adjacent large radius segments 106d, 108d, 10d, i.e., posts 53 are allowed a maximum distance of travel, thereby permitting all of braking elements 34 to fully extend outwardly from outer wall 60 of brake assembly base 25.

Referring back to FIG. 3, when brake setting selector 24 is rotated to a second position, e.g., when indicator 66 is aligned with indicia 104 indicating "2", brake element posts 53 that extend into camming indentations 108 and 110 are located on radial lines $L_2$ (FIG. 8) that intersect large radius segments 108d, 110d of intermediate restrictive camming indentation 108 and least restrictive camming indentation 110. Posts 53 that extend into most restrictive camming indentations 106 are located on radial line $L_2$ intersect small radius segments 106b. Therefore, posts 53 in intermediate restrictive indentations 108 and least restrictive indentations 110 may travel from a first position adjacent inner wall 108a, 110a to a position adjacent large radius segments 108d, 110d, i.e., posts 53 are allowed a maximum distance of travel, thereby permitting these braking elements 34 to fully extend outwardly from outer wall 60 of brake assembly base 25 to contact brake ring 120. However, posts 53 in most restrictive camming indentations 106 may only travel from a first position in contact with inner wall 106a to a position adjacent small radius segments 106b, i.e., these posts 53 are allowed little or no distance of travel, thereby prohibiting these braking elements 34 from fully extending outwardly to contact brake ring 120.

Referring back to FIG. 3, when brake setting selector 24 is rotated to a third position, e.g., when indicator 66 is aligned with indicia 104 indicating "4", brake element posts 53 that extend into least restrictive indentations 110 are located on radial lines $L_4$ (FIG. 8) that intersects large radius segments 110d of least restrictive camming indentation 110. Posts 53 that extend into intermediate camming indentations 108 and most restrictive camming indentations 106 are located on radial lines $L_4$ that intersect small radius segments 106b, 108b. Therefore, posts 53 in least restrictive indentations 110 may travel from a first position in contact with inner wall 110a to a position adjacent large radius segments 11d, i.e., posts 53 are allowed a maximum distance of travel, thereby permitting these braking elements 34 to fully extend outwardly from outer wall 60 of brake assembly base 25 to contact brake ring 120. However, posts 53 in intermediate restrictive indentations 108 and most restrictive camming indentations 106 may travel from a first position in contact with inner wall 106a, 108a to a position adjacent small radius segments 106b, 108b, i.e., posts 53 are allowed little or no distance of travel, thereby prohibiting these braking elements 34 from contacting brake ring 120.

Referring back to FIG. 3, when brake setting selector 24 may be rotated to a fourth position, e.g., when indicator 66 is aligned with indicia 104 indicating "6", posts 53 that extend into camming indentations 106, 108, and 110 are located on radial lines $L_6$ (FIG. 8) that intersect small radius segments 106b, 108b, 110b. Therefore, posts 53 in least restrictive indentations 110, intermediate restrictive indentations 108 and most restrictive indentations 106 may travel from a first position in contact with inner walls 106a, 108a, 110a to a position adjacent small radius segments 106b, 108b, 110b, i.e., all posts 53 are allowed little or no distance of travel, thereby prohibiting any braking elements 34 from contacting brake ring 120.

In summary, it can be seen that when brake setting selector 24 is rotated to a first position, all of brake elements 34 are permitted to fully extend to engage brake ring 120 for braking action. When brake setting selector 24 is rotated to a second position, only four of the six brake elements 34 are permitted to fully extend to engage brake ring 120 for braking action. When brake setting selector 24 is rotated to a third position, only two of the six brake elements 34 are permitted to fully extend to engage brake ring 120 for braking action. Finally, when brake selector 24 is rotated to a fourth position, none of the six brake elements 34 are permitted to fully extend to engage brake ring 120 for braking action. Therefore, by adjusting the brake setting selector 24 as desired, a user may control resistance to rotation of spool 9 during casting by controlling the number of braking elements 34 that may extend to contact brake ring 120 for providing braking action.

Although three pairs of camming indentations 102 and six braking elements 34 are shown in the exemplary embodiment, it should be understood that greater or fewer of both camming indentations 102 and braking elements 34 may be provided, depending on the degree of control that is desired. Additionally, although pairs of camming indentations 102 having similar outer surface camming profiles are provided, braking element assemblies 28 are contemplated that have individually distinct camming characteristics. Further, it may be desirable to group camming indentation 102 into groups where three or more camming indentations 102 are the same.

As will be understood by those skilled in the art, although the inventive braking element assembly 28 is preferred, other types of braking element assemblies (e.g., radially extending rods having braking weights, pads, and/or bristles slidably mounted thereon) could be used in the inventive braking apparatus. In addition, although the embodiment disclosed herein is shown as incorporated in a contemporary, low-profile baitcasting reel, it will be understood by those skilled in the art that the inventive apparatus can be employed in traditional baitcasting reels or generally any other type of baitcasting reel.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A braking apparatus for a fishing reel comprising:
a braking assembly having a base and a selector;
a contacting structure surrounding said braking assembly;
a plurality of braking elements slidably located within said base of said braking assembly, said braking elements slidably movable from a retracted position to an extended position, wherein said braking elements make braking contact with said contacting structure in said extended position;
said selector adapted to restrict selected braking elements from contacting said contacting structure; and
wherein said contacting structure is axially stationary with respect to said braking assembly.

2. The braking apparatus of claim 1 wherein:
said braking elements are extended to contact said contacting structure by centrifugal force.

3. The braking apparatus of claim 1 wherein:
each of said braking elements have a post extending from a surface of said braking elements, said post for limiting travel of said braking elements from said retracted position to said extended position.

4. The braking apparatus of claim 3 wherein:
said braking assembly is comprised of said selector and a brake assembly base;
said selector has a rearward face, said rearward face defining a plurality of indentations;
said brake assembly base has a forward face, said forward face defining a plurality of radial slots;
said rearward face of said selector mates against said forward face of said brake assembly base;
said braking elements are slidably located within said radial slots of said brake assembly base; and
said post of said braking elements protrude into said indentations of said forward face.

5. The braking apparatus of claim 4 wherein:
said indentations have an inner wall and an outer wall for restraining radial movement of said post of said braking elements, thereby establishing a location of said retracted position and said extended position of said braking elements.

6. The braking apparatus of claim 5 wherein:
said outer wall of said indentations have a small radius segment and a large radius segment.

7. The braking apparatus of claim 6 wherein:
said indentations and each post of said braking elements may be moved relative to one another such that each post may be selectively exposed to said small radius segment and said large radius segment for selectively restraining said braking elements.

8. The braking apparatus of claim 1 wherein:
said braking assembly is comprised of said selector and a brake assembly base; and
said selector is rotationally affixed to said brake assembly base.

9. The braking apparatus according to claim 1 wherein:
said braking assembly may be configured to selectively restrain a desired number of braking elements to prevent said desired number of braking elements from contacting said contacting structure.

10. A method for braking a reel on a fishing reel comprising the steps of:
setting a selector to restrict a desired number braking elements from radial movement within a base of a braking assembly;
spinning said braking assembly;
providing a contacting structure surrounding said braking assembly;
extending a selected number of braking elements from said base of said braking assembly with centrifugal force to make braking contact with said contacting structure.

11. The method of claim 10 wherein:
limiting travel of a selected one of said braking elements by selectively engaging a portion of said braking element.

12. The method according to claim 10 wherein:
said step of limiting travel of a selected one of said braking elements comprises locating a brake element post within one of a plurality of indentations formed in said braking assembly.

13. The method according to claim 10 wherein:
said step of setting a selector moves indentations relative to posts extending from said braking elements such that said posts are selectively located on a radial path that intersects one of a small radius segment and a large radius segment that comprise walls of said plurality of indentations.

14. The method according to claim 13 wherein:
said step of setting a selector comprises locating said small radius segment and said large radius segment by imparting relative rotational motion between said posts and said plurality of indentations for selectively restraining said braking elements.

15. The method of claim 10 further comprising the step of:
maintaining said contacting structure in an axially stationary relationship with respect to said braking assembly during use.

16. The method according to claim 10 wherein:
said step of setting a selector comprises rotating said selector with respect to a brake assembly base.

17. A braking apparatus for a fishing reel comprising:
a braking assembly having a base and a selector;
a contacting structure surrounding said braking assembly; and
a plurality of braking elements slidably located within said base of said braking assembly, said braking elements slidably movable from a retracted position to an extended position, wherein said braking elements make braking contact with said contacting structure in said extended position;
wherein each of said braking elements have a post extending from a surface of said braking elements, said post for limiting travel of said braking elements from said retracted position to said extended position;
a selector having a rearward face, said rearward face defining a plurality of indentations, said selector adapted to restrict selected braking elements from contacting said contacting structure;
wherein each of said plurality of indentations are adapted to receive said post.

18. A braking apparatus for a fishing reel comprising:
a braking assembly having a base and a selector;
a contacting structure surrounding said braking assembly;

a plurality of braking elements slidably located within said base of said braking assembly, said braking elements slidably movable from a retracted position to an extended position, wherein said braking elements make braking contact with said contacting structure in said extended position;

said selector adapted to restrict selected braking elements from contacting said contacting structure; and wherein said plurality of braking elements are located an equal distance from said selector.

* * * * *